Oct. 19, 1954  D. S. LOCK ET AL  2,691,861
CROP STRIPPING AND CONVEYING MECHANISM
Filed June 30, 1952  2 Sheets-Sheet 1
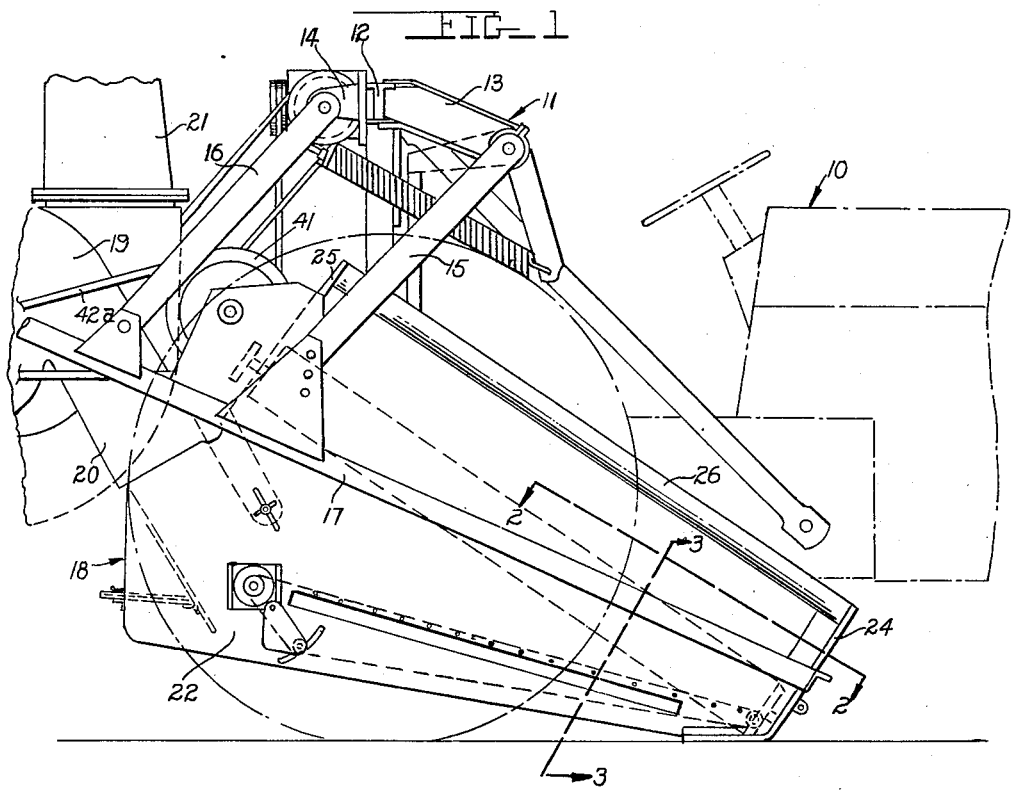
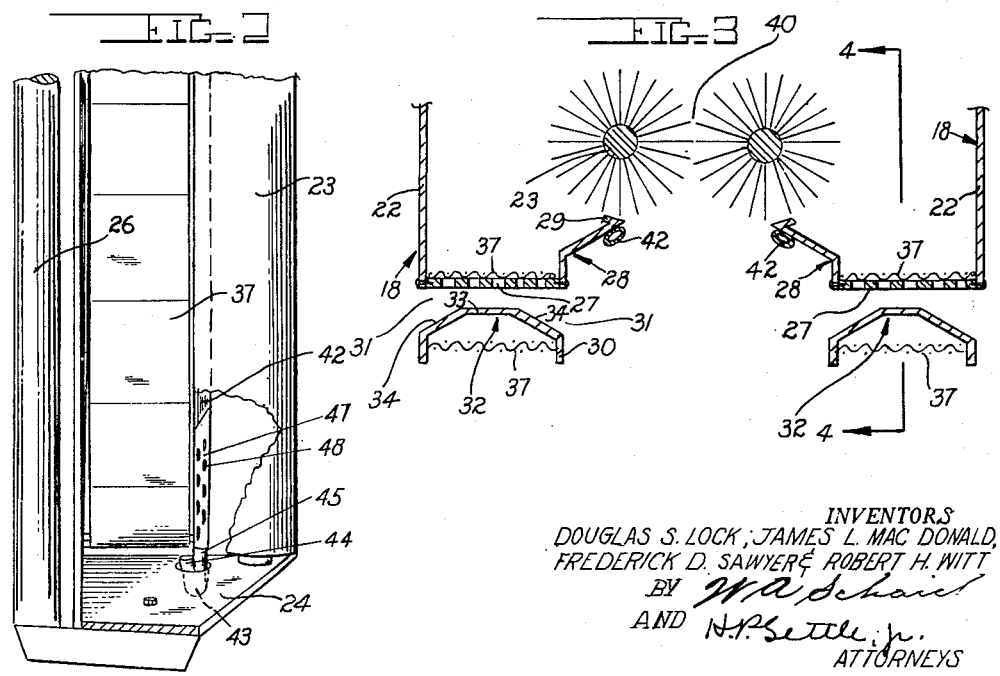
INVENTORS
DOUGLAS S. LOCK, JAMES L. MAC DONALD,
FREDERICK D. SAWYER & ROBERT H. WITT
BY
AND
ATTORNEYS

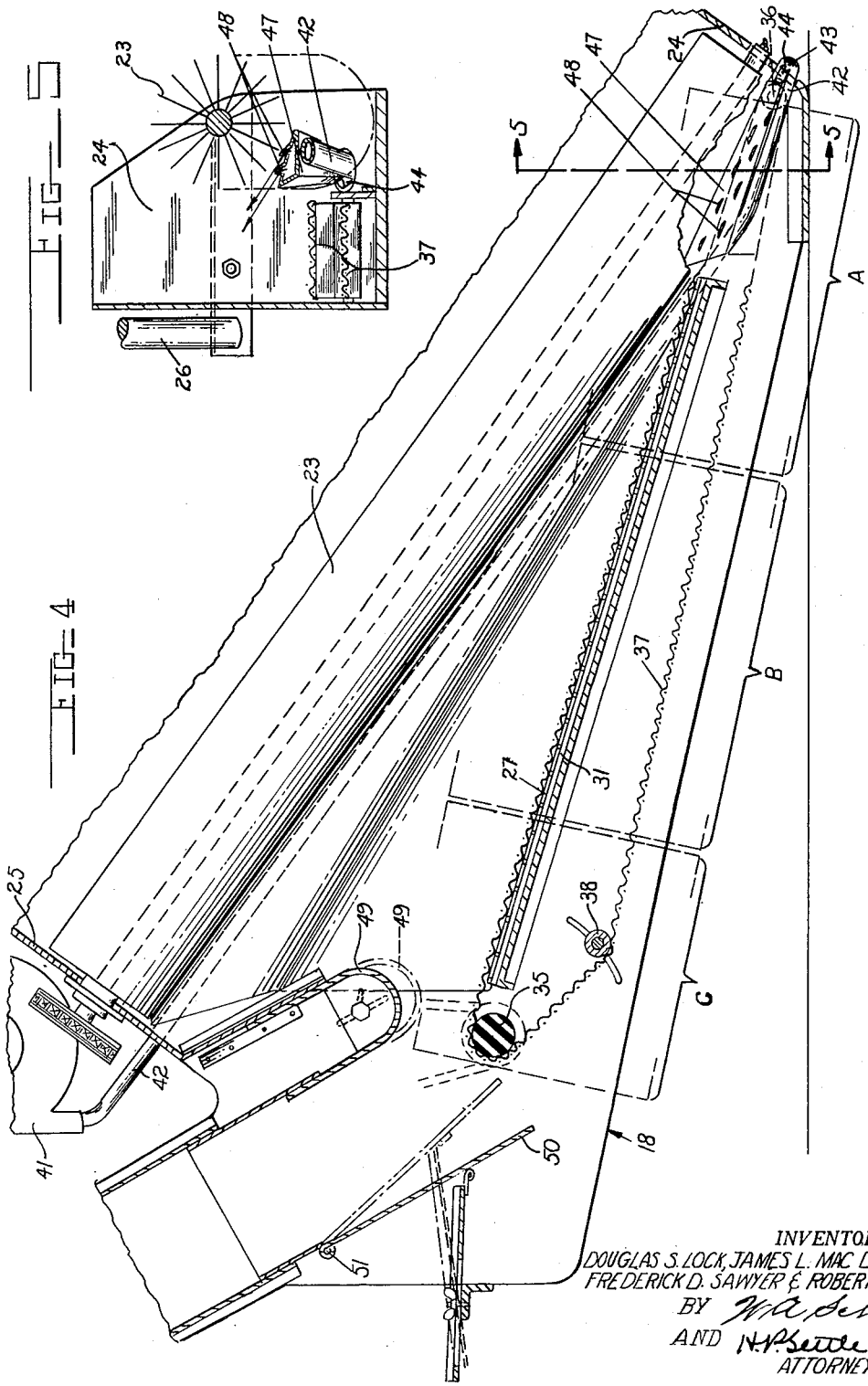

Patented Oct. 19, 1954

2,691,861

UNITED STATES PATENT OFFICE 2,691,861

CROP STRIPPING AND CONVEYING MECHANISM

Douglas S. Lock, Birmingham, James L. MacDonald, Pontiac, Frederick D. Sawyer, Birmingham, and Robert H. Witt, Royal Oak, Mich., assignors, by mesne assignments, to Ford Motor Company, Dearborn, Mich., a corporation of Delaware Application June 30, 1952, Serial No. 296,387

8 Claims. (Cl. 56—33)

The present invention relates to a cotton stripping and conveying mechanism and more particularly to a crop harvesting device wherein the stripped crop is mechanically and pneumatically conveyed from the harvesting elements to a receptacle.

In the pending application of Raymond J. Miller, Frederick D. Sawyer, and Robert H. Witt, Serial No. 264,362, filed January 2, 1952, now Patent No. 2,673,438 issued March 30, 1954, said application being assigned to the assignee of the present invention, there has been proposed crop conveying means utilizing mechanical feeding means for use with a pneumatic conveying system. More particularly, this earlier application discloses the utilization of crop stripping elements, such as brushes, for stripping the crop from a plant interposed therebetween, the elements being effective to convey the crop to a juxtapositioned longitudinally running belt or similar conveyor from which the air-floatable crop is removed by a suction pickup which is effective to elevate the crop to a blower or the like. The difficulty encountered in the use of such conveying means resides in the necessity for preventing contact between the stripped crop and the stripping element as the crop is retained upon and conveyed by the belts immediately adjacent the elements. If such contact is permitted, the elements will pick up the crop and carry the same thereabout, so that the crop may be lost by passage between the elements.

The present invention now provides an improved crop stripping and conveying mechanism wherein an air blast is utilized to aid in removing the crop from an associated stripping element and to prevent contact between the stripped crop and the stripping element after the crop has been deposited upon the conveying mechanism. Also, the air blast will direct the crop rearwardly along the conveying mechanism to aid in transporting the material to the suction pickup area located near the rear end of the conveyor. The air blast need be utilized only at the forward ends of the inclined stripping elements, since adequate shielding may be provided at the rearward positions thereof to prevent dragging of the crop from the conveyor by the stripping elements.

In addition to the advantages of preventing removal of the crop from the conveyor, the present invention provides for the improved separation of the crop from leaves, stalks, and the like trash which is incidentally stripped from the associated plant by the stripping elements; as well as separation from dirt, green bolls, and the like material of a density substantially greater than that of the stripped crop. To most efficiently perform the separation function, the conveyor is desirably divided into three zones or sections to which the crop is successively subjected; including a first zone located in the vicinity of the air blast means, a second zone located at the suction pickup end of the conveyor, and a third or intermediate zone located therebetween. The crop on the conveyor is subjected initially (in the first zone) to air pressure which serves to blow the relatively light, air-floatable crop from the adjacent stripping elements and also to direct the crop rearwardly along the conveyor, and the crop is next subjected to the intermediate zone at which the crop and trash are subjected only to atmospheric pressures. The conveyor is preferably perforated to provide for the escape of relatively heavy, finely divided material through the conveyor during passage of the crop through the intermediate zone. Finally, at the pickup zone, the relatively light crop is air floated from the conveyor by the suction effect of the intake system to leave only the relatively more dense trash on the belt.

It is, therefore, an important object of the present invention to provide an improved crop stripping and conveying mechanism for the harvesting of air-floatable crops.

Another object is the provision of an improved crop stripping and conveying means whereby an air-floatable crop upon a mechanical conveyor is subjected successively to pressured air, to atmospheric pressure conditions, and then to reduced pressure conditions for effectively separating the desired crop from relatively more dense material.

It is a further important object to provide a crop stripping and conveying mechanism including a pair of counterrotatable elements effective to strip a crop and to convey the same to an adjacent conveying mechanism, and means for subjecting the crop on the conveying mechanism to an air blast to prevent contact between the stripping elements and crop.

Yet another object of the present invention is the provision of a crop stripping and conveying mechanism including a rotatable stripping element effective to remove a crop from associated plants and to centrifugally fling the crop upon a conveying surface, and means for initially subjecting the crop to an air blast to restrain the crop against again contacting the stripping element and finally subjecting the crop to suction to remove the same from the conveying surface.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a fragmentary side elevational view of a harvesting machine provided with a crop stripping and conveying mechanism of the present invention;

Figure 2 is an enlarged sectional view taken along the plane 2—2 of Figure 1;

Figure 3 is a greatly enlarged sectional view taken along the plane 3—3 of Figure 1;

Figure 4 is an enlarged sectional view, with parts shown in elevation, taken along the plane 4—4 of Figure 3; and Figure 5 is a sectional view taken along the plane 5—5 of Figure 4.

As shown on the drawings:

In Figure 1, reference numeral 10 refers generally to a tractor or similar prime mover having mounted thereon a harvesting machine indicated generally at 11.

The machine 11 generally comprises a rigid laterally extending beam 12 mounted upon the tractor rear axle and having rigidly joined thereto forwardly and rearwardly extending arms 13 and 14, respectively, each pivotally supporting a laterally spaced pair of parallel lift links 15 and 16 respectively. The substantially parallel links 15 and 16 support at their lower free ends a longitudinally extending harvesting head frame 17 of U-shaped configuration. Intermediate the legs of the frame 17, there is disposed a laterally spaced pair of harvesting units indicated generally at 18 and hereinafter more fully described. The frame 17 also carries a rearwardly located combined suction intake and pressure output fan 19 having an intake conduit 20 vented to each of the units 18 and having its outlet communicating with an elevator stack 21 which projects upwardly and rearwardly for conveying material to a suitable receptacle, such as a trailed wagon or a tractor-mounted basket. Means are provided for driving the fan 19 and the harvesting head unit, which means are more fully described in the above identified Sawyer, Witt, and Miller patent.

The harvesting head units 18, as best illustrated in Figures 3 and 4, each comprises an outside flare sheet 22 extending vertically and longitudinally of the unit to partially enclose a longitudinally extending stripping element 23, which desirably takes the form of a bristle brush. The spindle of each of the brushes is journaled between a head front plate 24 and a rear plate 25 rigidly joined to the associated flare sheet 22, and the plates 24 and 25 are joined by a longitudinally extending tubular brace 26 generally overlying the brush 23. Intermediate the vertical dimension of the flare sheet and extending substantially along the length thereof, but terminating short of the front ends of the brushes, there is provided an apertured plate 27 projecting laterally inwardly from the flare sheet toward the associated brush 23 to generally underlie the brush, and the inner end of the plate 27 forms a cutoff lip 28 projecting inwardly to underlie the brush and terminating in an outwardly directed shoulder 29. The shoulder 29 overlies the downwardly and outwardly sloping adjacent surface of the plate 28 to prevent the snagging of cotton or other stripped crop upon the plate 28 by the rotating brush 23 overlying the plate surface.

The plate 28 is actually formed as an extension of an inner flare sheet 30 parallel to the outer flare sheet 22. The flare sheets 22 and 30 are each slotted, as at 31, the slots 31 extending longitudinally of the sheets generally parallel to the lower edges thereof. The slot is closed at its upper end by the perforated plate 27 and at its lower end by a bridging plate 32 having a central horizontal portion 33 and a downwardly and outwardly sloping side portion 34.

Adjacent the rear end of the slots 31 there is provided a cylindrical roller 35 journaled by and extending transversely between the flare sheets 22 and 30. A similar roller 36 is provided forwardly of the forward edge of the slots 31 immediately adjacent and laterally spaced from the forward ends of the brushes 23. A perforated conveyor belt 37 is lapped about the rolls 35 and 36 with the upper reach of the belt 37 overlying the perforate plate 27, and the return reach of the endless belt underlying the imperforately reflective plate 32. The belt is driven by driving the roller 35 in a counterclockwise direction, as viewed in Figure 4, so that the upper reach of the belt travels upwardly and rearwardly over plate 27. The endless belt 37 is tensioned by an idler roll 38 disposed within the loop of the belt and urged there against to tighten the same.

It will be appreciated that a pair of harvesting heads 18 are provided, the heads being substantially identical in construction, but being mirror images of one another. The brushes 23 are each journaled by the individual head section, and the heads are mounted upon the U-shaped frame 17 so that the brushes 23 are juxtapositioned, as indicated in Figure 3. The brushes 23 thus define therebetween a harvest nip 40 at which the cotton or other desired crop is stripped from the associated plant. The counterrotating brushes 23 are effective to convey a crop from the plant interposed in the nip 40 laterally outwardly from the nip to the belt 37. The crop is actually flung centrifugally from the brushes in the general direction of the belt 37 with the outside flare sheets 22 and the plates 28 serving to confine the crop so that it will drop by gravity to the belt.

The plates 27 are disposed laterally outwardly and vertically beneath the brushes 23, so that contact between the brushes and the crop on the conveyors overlying the plates will be prevented. At the extreme forward ends of the brushes 23, it will be appreciated that it is not possible to provide a plate 28 of sufficient vertical dimension to substantially space the associated brush 23 from the adjacent belt 37. Also, the plates 27 terminate in spaced relation to the forward ends of the brushes. Consequently, there is a possibility of the brush dragging the crop from the belt 37 into the space between the brushes where the crop will be dumped upon the ground. Therefore, it is necessary that means be provided for preventing contact between the brush and the crop.

The present invention provides such means including a centrifugal fan or blower 41 placed upon the harvesting frame rearwardly of the brushes and adapted to be driven by the V-belt 42a which also serves to drive the primary blower 19. The outlet side of the blower 41 discharges into a pipe 42 for each of the harvesting head units, each pipe 42 extending longitudinally of the associated harvesting head to project toward the forward end thereof. Preferably, each pipe 42 is secured to the plate 28 of the associate harvesting head, and the pipes 42 each terminate in an elbow fitting 43 including a rearwardly directed nozzle 44 effective to direct an air blast rearwardly along the exposed upper surface of the belt 37, the end of this nozzle being slightly laterally outwardly directed, so as to be directed away from the associated brush. The nozzle 44 is thus effective to direct an air stream upon the crop which blows the crop laterally away from the brush toward the adjacent outer flare sheet 22. The elbow 43 also includes a second nozzle 45 extending in a direction substantially parallel to the brush 23 and immediately adjacent the same. The nozzle 45 discharges into a plenum chamber, as best illustrated in Figure 2, and includes a casing 47 enclosing the chamber, the casing being provided with a plurality of rearwardly and laterally outwardly opening louvres 48. Air flow from the chamber through the louvres 48 also serves to direct the crop from the immediately adjacent brush 23. The combined air blast effect of the rearwardly discharging louvres 48 is effective to move the air-floatable crop from the vicinity of the brushes toward the outer flare sheet 22 and also to move the crop rearwardly along the upper reach of the belts 37 to aid in conveying the crop rearwardly.

As indicated in Figure 4, the air blast is effective only within a relatively short distance along the upper surface of the belt 37 and the effective pressure area or zone is indicated by reference character A. After the crop has been conveyed by the belt from the zone A, the crop passes through the zone B to which the crop is subjected to substantially atmospheric pressures. In the zone B, the crop and associated trash, such as dirt, leaves, or the like, will be moved upon the perforated belt 37 over the perforated plate 27 and finely divided dirt and the like trash of greater density than the crop will settle downwardly through the belt and plate onto the imperforate deflector or bridging plate 32 from which the dirt will be discharged along the inclined surface 34. Thus, a gravity separation will be effected in the dead air area of zone B to remove finely divided material from the desired crop, and the deflector plate 32 prevents the depositing of such trash upon the return reach of the belt 37.

At the rearmost portion of the upper reach of the belt 37, the desired crop is air-floated from the belt by the suction effect exerted by the intake side of the primary fan 19. The structure includes an upper and rearwardly inclined nose valve 49 which is slidable, as indicated in dotted outline, towards and away from the upper surface of the belt 37 to adjust the volume of air pulled into the intake side of the fan 19, thus varying the suction effect exerted upon the crop disposed upon the belt. Also, a hinged valve plate 50 is provided in substantial longitudinal alignment with the belt upper reach, the plate 50 being adjustable about its hinge point 51 towards and away from the driven roller 35 so as to vary the discharge opening through which trash, green bolls, and the like, are discharged upon passage of the belt 37 about the roller 35.

Thus, it will be seen that the present invention provides a new and novel means for stripping a crop from the associated plant and for conveying the stripped crop from the stripping element to a blower-type conveyor. More specifically, the present invention provides air blast means cooperable with a stripping element and a conveyor for preventing the removal of a stripped crop from the conveyor by the brush. Further, the air blast means is effected to direct the crop along the conveying medium in the direction in which crop flow is desired. In addition, separation of relatively more dense trash from the desirable air floatable crop is effected by subjecting the crop successively to pressured air, atmospheric air, and suction within three separate and distinct zones disposed upon the length of travel of the crop.

It will, of course, be understood that various details of construction may be varied through a wide range without departing from the principles of this invention and it is, therefore, not the purpose to limit the patent granted hereon otherwise than necessitated by the scope of the appended claims.

We claim:

1. In a stripper-type harvesting machine, a pair of laterally juxtapositioned stripping elements rotatable about parallel upwardly and rearwardly inclined axes, respectively, said elements defining a stripping nip therebetween, conveying means positioned adjacent to and laterally outwardly from each of said elements, said means each having an exposed conveying surface upwardly and rearwardly inclined to a lesser degree than said elements, a cutoff plate having an edge underlying each of said elements except at the forward extremity thereof for guiding a stripped crop from the associated one of said elements to the associated conveying surface, and air blast means at the forward extremity of each of said elements including nozzle means generally underlying the element and directed rearwardly generally over said conveying surface in substantial longitudinal alignment with said cutoff plate to aid in removing a crop from the stripping element forward end ahead of said plate.

2. In a stripper-type harvesting machine having a flare sheet enclosing a pair of longitudinally extending counter-rotatable stripping elements defining a stripping nip therebetween and a longitudinally extending conveyor positioned adjacent each of said elements, said elements being effective to strip a crop from a plant interposed in said nip and to convey said crop to said conveyors for centrifugal discharge thereonto, the improvements of a source of pressured air, means for conveying pressured air from said source to the forward end of said elements, respectively, and a nozzle carried by said flare sheet at said forward end of each element for directing pressured air generally longitudinally of said elements and said conveyors to aid in transferring said crop from said elements to said conveyors and in moving said crop along said conveyors.

3. In a harvesting machine having a pair of counterrotatable harvesting elements for removing an air-floatable crop from an associated plant, belt means for receiving said crop from said elements and having an upper perforate conveying surface positioned adjacent said elements, suction pickup means at the discharge end of said surface for removing the crop therefrom, and air blast means at the other end of said surface for directing air under pressure along the length of said conveying surface to aid in moving the crop therealong, said surface having a dead-air area between said pickup means and said blast means to accommodate the separation of relatively heavy particulated trash from the crop by the passage of such trash through the surface perforations of said conveying surface, whereby a crop on said surface is successively subjected to air under pressure, to atmospheric pressure, and to suction.

4. In a stripper-type harvesting machine having a pair of relatively rotatable elongated axially parallel stripping brushes and a longitudinally extending conveyor having an upper rearwardly extending conveying surface adjacent one of said brushes, the improvements of means for preventing contact between a crop on said conveying surface and the adjacent stripping brush comprising a source of air under pressure, means defining a plenum chamber underlying said one brush in substantial lateral juxtaposition to said conveying surface and having louvered openings directed toward said conveying surface, and a conduit joining said source to said chamber to direct air from said openings across said conveying surface.

5. In a stripper-like harvesting machine having a pair of counterrotatable crop stripping elements and a suction pickup means, means for transferring an air-floatable crop from the stripping elements to the suction pickup means comprising a conveyor belt having an upper flight extending from said element to said pickup means, a source of fluid under pressure, means for conducting said fluid from said source to the element end of said conveyor, a first nozzle means receiving fluid from said conducting means and effective to direct a blast of fluid under pressure from said element toward said conveyor to aid in the transfer of said air-floatable crop thereto and a second nozzle means also receiving fluid from said conducting means and directed along said belt upper flight to aid in the conveying of the crop therealong.

6. In a stripper-type harvesting machine having a pair of longitudinally extending relatively rotatable elongated axially parallel stripping elements and a longitudinally extending conveyor having an upper rearwardly extending conveying surface adjacent one of said elements, the improvements which comprise a cut-off plate generally underlying said element and terminating rearwardly of the element front end, a source of air under pressure and means conveying air from said source to the forward end of said element and directing the air generally rearwardly along the conveying surface immediately adjacent said one element and at an angle with respect to the axis of said one element to aid in transferring a stripped crop from said one element to said conveying surface in advance of said plate.

7. In a stripper-type harvesting machine, a pair of laterally juxtapositioned stripping brushes rotatable parallel upwardly and rearwardly inclined axes, respectively, said brushes defining a stripping nip therebetween, an endless conveyor belt positioned adjacent to and laterally outwardly from each of said brushes, said belts having upper conveying surfaces upwardly and rearwardly inclined to a lesser degree than said brushes, a cutoff plate having an edge underlying each of said brushes except at the forward extremity thereof for guiding a stripped crop from said brush to the associated conveying surface, and air blast means at the forward extremity of each of said brushes including a source of pressured air, conduit means for conveying air from said source to said brush and nozzle means generally underlying said brush in substantial longitudinal alignment with said cutoff plate for directing a blast of air rearwardly along the brush to aid in removing the crop from the brush forward end ahead of said plate.

8. In a harvesting machine having a plurality of harvesting elements for removing an air-floatable crop from an associated plant, conveyor means for receiving said crop from said elements including an endless conveyor belt defining a perforate conveying surface positioned adjacent said elements and longitudinally spaced roller drive means for supporting said belt and driving the same rearwardly alongside said harvesting elements, suction pickup means at the discharge end of said surface for removing the crop therefrom, and air blast means at the other end of said surface to aid in moving the crop therealong, said surface having an intermediate portion interposed between said pickup means and said blast means at which the crop thereon is subjected to atmospheric pressure to accommodate the separation of relatively heavy particulated trash from the crop by the passage of such trash through the surface perforations of said conveying surface.

References Cited in the file of this patent

UNITED STATES PATENTS

| Number | Name | Date |
|--------|------|------|
| 1,069,997 | Appleby | Aug. 12, 1913 |
| 1,731,826 | Morava | Oct. 15, 1929 |
| 2,001,077 | Thomann | May 14, 1935 |
| 2,388,454 | Weeth et al. | Nov. 6, 1945 |